L. FOURNIER.
REVERSING GEAR MECHANISM.
APPLICATION FILED AUG. 18, 1915.

1,178,226.

Patented Apr. 4, 1916.

WITNESS
A. B. Cornelius

INVENTOR
Louis Fournier
BY
Pierre Barnes
ATTORNEY

UNITED STATES PATENT OFFICE.

LOUIS FOURNIER, OF SEATTLE, WASHINGTON, ASSIGNOR OF ONE-THIRD TO WILLIAM F. FOURNIER AND ONE-THIRD TO FRIDRICH WILHELM MILLER, BOTH OF BREMERTON, WASHINGTON.

REVERSING-GEAR MECHANISM.

1,178,226.   Specification of Letters Patent.   Patented Apr. 4, 1916.

Application filed August 18, 1915. Serial No. 46,021.

*To all whom it may concern:*

Be it known that I, LOUIS FOURNIER, a citizen of the United States, residing at Seattle, in the county of King and State of Washington, have invented certain new and useful Improvements in Reversing-Gear Mechanism, of which the following is a specification.

This invention relates to mechanism for transmitting power from a driving shaft to a driven shaft in the same or contrary rotary directions; and its object is the perfecting of such mechanism to render the same more durable, more efficient and less liable to become deranged than in appliances hitherto in use and known to me.

The invention consists in the novel construction, adaptation and combination of parts, as will be hereinafter described and claimed.

Figure 2:
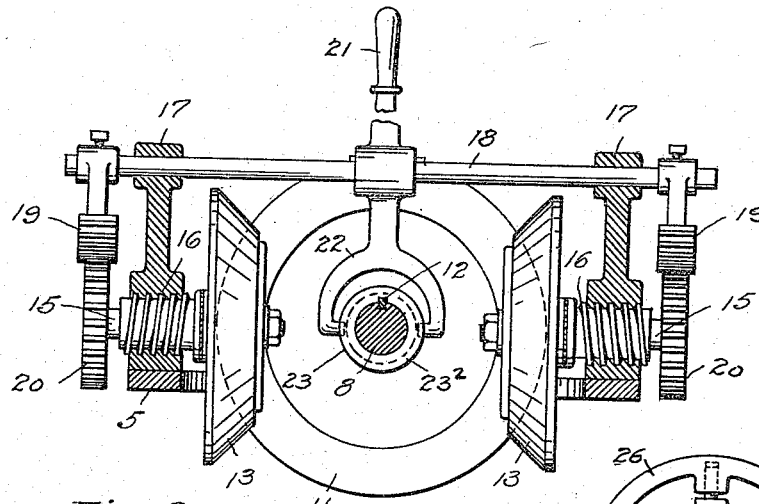
Figure 3:
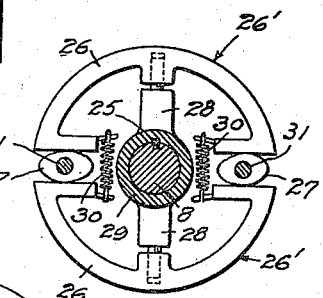
Figure 4:
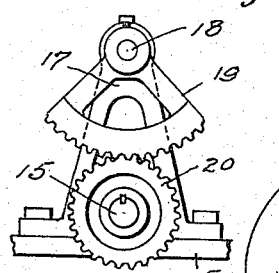
Figure 1:
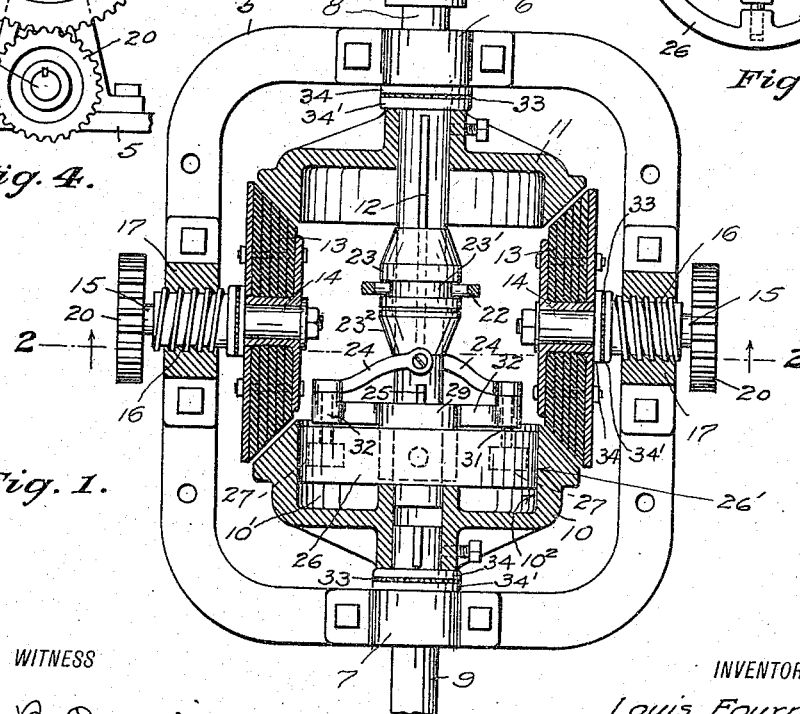

In the accompanying drawings, Figure 1 is a horizontal sectional view of reverse gear mechanism embodying my invention in the form now preferred by me. Fig. 2 is a transverse vertical section taken substantially through 2—2 of Fig. 1. Fig. 3 is a front elevational view of frictional clutch devices such as shown in Fig. 2. Fig. 4 is a detail side elevational view illustrating the connection between the rocker and screw shafts.

Referring to said drawings, the numeral 5 designates the supporting frame provided with journal boxes 6 and 7 for the axially alined driving and driven shafts 8 and 9. The driving shaft 8 may be the shaft of a motor and the other shaft 9 the propeller shaft of a boat.

Keyed or otherwise rigidly secured to the shaft 9 is a bevel gear wheel 10 and in the hub thereof is desirably inserted the end of the power shaft 8.

As shown in Fig. 1 a bevel gear wheel 11 is fixedly secured as by a key 12 to the shaft 8. At diametrically opposite sides of said shaft are bevel gear wheels 13 which are rotatably mounted on journals 14 provided on transversely disposed stub shafts 15. These shafts are respectively formed with right and left hand screw threaded portions 16 which extend through internally threaded apertures provided in standards 17 which, in effect, constitute a part of the frame 5 and may be formed integral therewith. In superposed relation to the stub shafts 15 and journaled in said standards is a rocker shaft 18 carrying at its outer ends sector toothed gear elements 19 which mesh with spur gears 20 which are secured to the respective stub shafts 15. Secured to rocker shaft 18 is a lever having an upwardly directed arm 21 and a downwardly directed forked arm 22 whose bifurcations engage in a peripheral slot $23^1$ of a sleeve 23 splined for axial movements to the driving shaft 8 by means, preferably, of the key 12. The sleeve end adjacent to the gear wheel 10 is tapered as at $23^2$ so that as it is thrust toward the wheel it will engage under and impart outward movements to the actuating arms 24 of a clutch member which is secured by a key 25 to the driving shaft 8 and engage the gear wheel 10 when the driven shaft 9 is to be coupled with the driving shaft 8.

More particularly, the gear wheel 10 is formed with a recess $10^1$ to provide an inner peripheral surface $10^2$ which, upon occasion, is engaged by the arcuate surfaces $26^1$ of two substantially semi-circular segments 26 (Fig. 3) when the latter are pushed asunder by means of cams 27 interposed between the ends of said segments. The segments are carried by and movable radially upon arms 28 which extend from a hub 29 and constitute the parts of the referred to clutch member which is secured by the key 25 to the driving shaft. Springs 30 tend to yieldingly retain the segments 26 in disengaged relations to the wheel 10. The cams 27 are rigidly secured to pins 31 which extend through arms 32 (Fig. 1) of the hub 29 and serve as the pivots for the aforesaid clutch arms 24.

As illustrated in the drawing, the gears 10, 11 and 13 are of the type known as bevel friction wheels, although toothed gear wheels may, if desired, be used instead. Under such conditions the only changes necessary would be to have the wheel 11 mounted to rotate upon the driving shaft 8 and engage the referred to wheel with its shaft by clutch devices such as in the illustrated embodiment is associated with the wheel 10.

To overcome the friction due to the end thrusts obtaining when the various gears are engaged, there is preferably employed antifriction balls 33 interposed between collars 34 and $34^1$ as shown on the respective shafts.

The operation of the invention is as follows: When the sleeve 23 is shifted through the agency of the lever 21—22 to actuate the clutch, the driving shaft 8 is coupled to the driven shaft 9 and the latter is rotated by and with the driving shaft. When this occurs, and by reason of the rocker shaft 18 being affected by said lever, the sector gears 19 influence the gears 20 to rotate the shafts 15 whereby the screw threads 16 serve to move the gear wheels 13 away from the gear wheels 10 and 11. When said lever is swung in a contrary direction, the sleeve 23 releases the clutch, whereupon the elements 26 are disengaged from the gear wheel 10 through the offices of the springs 30. Meanwhile the sector gears 19 influence the shafts 15 to turn the same so that the screws thereof will move the gear wheels 13 toward the gear wheels 10 and 11 to eventually effect the engagement of such wheels, resulting in the rotation imparted from the driving shaft being reversed with respect to the driven shaft. When the lever is moved into neutral position, it is evident that the driving shaft is rendered inoperative to rotate the driven shaft in either direction.

The advantages of the present invention reside principally in its simplicity, whereby a single clutch acting in coöperation with two gear wheels provided, respectively, on the driving and driven shaft and also with the intermediate gear wheels, are operable through the instrumentality of a single lever to transmit motion to the driven shaft in selected rotary directions or to render the driven shaft idle.

One of the intermediate gear wheels 13 and the devices for operatively connecting the same with the rocker shaft may, if desired, be omitted, although I prefer to employ both as I find in practice that the power is better distributed, with a consequent lessening of the strains, and enables a relatively large amount of power to be transmitted with friction wheels.

What I claim, is—

1. In a reversing gear mechanism, the combination of the frame, axially alined driving and driven shafts journaled in said frame, bevel gear wheels rigidly mounted on the respective shafts, one of said wheels serving as a clutch member, a clutch member complementary thereto and splined to the driving shaft, a lever connected with the last named clutch member to effect the engagement or disengagement of the same with its mate, an intermediate bevel gear wheel, a stub shaft arranged rectangular to the axis of the aforesaid shafts, a screw thread provided in said stub shaft and engaging internal threads provided in the bearing of such shaft on the frame, and operative connections between said lever and the stub shaft so that the lever when employed to effect the coupling of said clutch members will rotate the stub shaft to withdraw the intermediate wheel from the two first named wheels and when the lever is employed to uncouple the clutch, to effect the movement of the intermediate wheel toward the other wheel.

2. In a reversing gear, the combination of the frame, a driving shaft, a driven shaft in axial alinement therewith in said frame, a bevel gear rigidly secured to said driving shaft, a bevel gear rigidly secured to said driven shaft, one of said gear wheels serving as a clutch member, a complementary clutch member connected to the driving shaft to rotate therewith, a sleeve mounted on one of said shafts for actuating the clutch, a stub shaft disposed in rectangular relations to the axis of the aforesaid shafts and provided with screw threads which engage in a screw-threaded bearing provided in the frame, an intermediate bevel gear-wheel journaled on said stub shaft, a toothed gear-wheel rigidly secured to said stub shaft, a rocker shaft, a lever for oscillating said rocker shaft, a sector gear provided on said rocker-shaft and in mesh with said toothed gear, and operative connection between said rocker shaft and the sleeve whereby the latter may be influenced by the rotary movements of said rocker shaft to respectively engage or disengage the clutch when the intermediate gear is disengaged or engaged with the first named gears.

Signed at Seattle, Washington, this 24th day of July, 1915.

LOUIS FOURNIER.

Witness:
PIERRE BARNES.